(12) United States Patent
Ghosh et al.

(10) Patent No.: US 6,865,187 B1
(45) Date of Patent: Mar. 8, 2005

(54) METHOD AND APPARATUS USING TRANSITION STATE PROTOCOL SIGNALING FOR FAX TRANSPORT MANNER CAPABILITY EXCHANGE

(75) Inventors: Shomit M. Ghosh, San Jose, CA (US); Shrikanth Kattemalvadi, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/346,111

(22) Filed: Jun. 30, 1999

(51) Int. Cl.[7] ............................................. H04L 12/28
(52) U.S. Cl. ........................ 370/431; 370/236; 358/256
(58) Field of Search ........................ 370/431, 236–244, 370/252, 465–467, 235, 389–409, 471, 314, 426; 379/905, 93.08–93.15, 100.17, 93.02, 100.09, 100.12; 703/24, 25; 358/407, 234, 403, 434–438, 256, 440–443, 115.15; 709/236

(56) References Cited

U.S. PATENT DOCUMENTS

| | | | |
|---|---|---|---|
| 4,532,379 A | | 7/1985 | Tsukioka |
| 4,586,086 A | * | 4/1986 | Ohzeki ........................ 358/256 |
| 4,642,697 A | | 2/1987 | Wada |
| 4,652,933 A | * | 3/1987 | Koshiishi .................... 358/256 |
| 5,016,115 A | | 5/1991 | Calkins |
| 5,065,426 A | | 11/1991 | Greenstein et al. |
| 5,090,049 A | | 2/1992 | Chen |
| 5,115,431 A | | 5/1992 | Williams et al. |
| 5,170,266 A | | 12/1992 | Marsh et al. |
| 5,175,634 A | * | 12/1992 | Matsuzaki ................... 358/407 |
| 5,438,433 A | | 8/1995 | Reifman et al. |
| 5,452,287 A | * | 9/1995 | DiCecco et al. ............. 370/236 |
| 5,473,691 A | * | 12/1995 | Menezes et al. ............. 358/440 |
| 5,517,324 A | * | 5/1996 | Fite, Jr. et al. .............. 358/434 |
| 5,519,640 A | * | 5/1996 | Ganesan et al. ............. 709/236 |
| 5,539,530 A | | 7/1996 | Reifman et al. |
| 5,621,894 A | | 4/1997 | Menezes et al. |
| 5,644,633 A | | 7/1997 | Kaufeld et al. |
| 5,666,489 A | | 9/1997 | Fite, Jr. et al. |
| 5,735,285 A | | 4/1998 | Albert et al. |
| 5,805,299 A | * | 9/1998 | Sakayama et al. ........... 358/403 |
| 5,841,843 A | | 11/1998 | Bristow et al. |
| 5,850,436 A | | 12/1998 | Rosen et al. |
| 5,912,894 A | * | 6/1999 | Duault et al. ................ 370/433 |
| 5,917,615 A | | 6/1999 | Reifman et al. |
| 5,956,681 A | * | 9/1999 | Yamakita .................... 704/260 |
| 5,963,621 A | * | 10/1999 | Dimolitsas et al. ......... 379/93.08 |
| 6,009,087 A | | 12/1999 | Uchida et al. |
| 6,057,938 A | * | 5/2000 | Abe et al. ................... 358/400 |
| 6,061,365 A | * | 5/2000 | Yeung et al. ................ 370/470 |
| 6,081,506 A | * | 6/2000 | Buyukkoc et al. ........... 370/235 |
| 6,094,277 A | | 7/2000 | Toyoda |

(List continued on next page.)

OTHER PUBLICATIONS

Ehsan Daeipour, "Clock Compensation in a Data/Fax Relay System", Mar. 1999, IEEE International Conference, vol. 4, pp. 2199–2202.*

*Primary Examiner*—Chi Pham
*Assistant Examiner*—Prenell Jones
(74) *Attorney, Agent, or Firm*—Blakely, Sokoloff, Taylor & Zafman LLP

(57) ABSTRACT

A method that involves recognizing an incoming FAX call at a destination edge node, the destination edge node supportive of at least two FAX transport manners. A first control packet is sent from the destination edge node to an originating edge node that effectively requests transmission of the FAX call according to one of the FAX transport manners. A second control packet is sent from the originating edge node to the destination edge node that effectively confirms or refuses to confirm transmission of the FAX call according to one of the FAX transport manners.

32 Claims, 8 Drawing Sheets

U.S. PATENT DOCUMENTS

| | | |
|---|---|---|
| 6,181,679 B1 * | 1/2001 | Ashton et al. ............... 370/244 |
| 6,208,650 B1 | 3/2001 | Hassell et al. |
| 6,262,992 B1 * | 7/2001 | Nelson et al. ............... 370/426 |
| 6,330,070 B1 | 12/2001 | Toyoda et al. |
| 6,411,689 B1 | 6/2002 | Shi et al. |
| 6,430,196 B1 | 8/2002 | Baroudi |
| 6,445,694 B1 | 9/2002 | Swartz |
| 6,486,975 B1 | 11/2002 | Verreault et al. |
| 6,535,505 B1 | 3/2003 | Hwang et al. |
| 6,560,196 B1 | 5/2003 | Wei |
| 6,584,108 B1 | 6/2003 | Chung et al. |
| 6,611,531 B1 | 8/2003 | Chen et al. |
| 6,650,635 B1 | 11/2003 | Weinstein et al. |
| 6,667,972 B1 | 12/2003 | Foltan et al. |

* cited by examiner

METHOD AND APPARATUS USING TRANSITION STATE PROTOCOL SIGNALING FOR FAX TRANSPORT MANNER CAPABILITY EXCHANGE

FIELD OF THE INVENTION

The present invention pertains to telecommunications. More specifically, the present invention relates to extensions to the transition state protocol (TSP) to enable fax relay over packet switched networks.

BACKGROUND

FIG. 1 shows an exemplary network having a packet switched wide area network (WAN) 6 used to transport, for example, enterprise traffic between remote corporate campuses 10, 11. Associated with each remote campus 10, 11 are edge nodes 5, 7. Edge nodes 5, 7 are used as gateways between the WAN 6 and the campus equipment 4, 8.

Note that telephony equipment may be part of the campus 10, 11 network. Specifically telephones (e.g., telephone 1), FAX machines (e.g., FAX machines 3, 9), PBXs (e.g., PBXs 4,8) or other device (such as a modem) used to send receive information over a time division multiplexed (TDM) network, such as the telephone network, are part of the overall network formed by attachment to the packet switched WAN 6.

In cases where telephony equipment is serviced by a packet switched WAN, the edge nodes 5,7 typically perform some form of TDM/packet translation. Because the telephony equipment is designed to interface with a TDM network, the edge nodes 5,7 provide a TDM network interface 12, 13 for this equipment. Thus edge nodes 5, 7 translate the telephony traffic to/from a packet switched network interface 14, 15 from/to a TDM network interface 12, 13.

Edge nodes 5, 7 also perform various forms of compression in order to reduce bandwidth consumption of the WAN 6 by the telephony traffic. Typically the TDM network interface 12, 13 comprises a 64 kb/s channel for each telephony line (e.g., telephony line 2). Telephone lines may also be referred to as channels. The edge nodes 5, 7 are responsible for reducing the per channel bandwidth below 64 kb/s. This results in more efficient utilization of the WAN 6.

For example, an outgoing telephone call that consumes one telephony line is usually compressed from 64 kb/s to 32, 16 or 8 kb/s by a compression algorithm executed by a digital signal processor (DSP) within the edge node (e.g., edge node 5). The outgoing call then enters the WAN 6 as a 32, 16 or 8 kb/s offered load (not counting overhead) resulting in a 32, 48 or 56 kb/s savings in WAN 6 bandwidth. The receiving edge node (e.g., edge node 7) decompresses the phone call back to 64 kb/s and sends the call over TDM interface 13 to PBX 8.

Because FAX (also referred to as facsimile) traffic typically consumes a single telephony line (e.g., telephony line 17), a FAX call also receives up to 64 kb/s of service at the TDM interface 12. In order to reduce WAN 6 bandwidth consumption, the FAX call may be "compressed" or otherwise reduced. A technology known as FAX Relay, mostly embodied in ITU standards T.4, T.6, T.30, V.17, V.21, V.27, V.29 and V.33, specifies the manner in which a 64 kb/s FAX data stream is reduced to a lower bit rate (such as 0.3, 2.4, 4.8, 9.6, and 14.4 kbps). Fax Relay involves identification of a baseband image signal from the 64 kb/s stream. Edge nodes 5, 7 may therefore also perform (besides voice compression/decompression) FAX Relay processing functions for FAX calls in order to reduce WAN 6 bandwidth consumption while maintaining a TDM interface 12, 13 for the telephony equipment.

A problem with implementing Fax Relay is the relative newness of FAX Relay for packet switched networks. Existing packet switched WANs have a sizable installed base of equipment without Fax Relay capability. Thus a transmitting edge node (e.g., edge node 5) and a receiving edge node (e.g., edge node 7) should first communicate with one another to ensure both have the ability to process Fax Relay signals.

A packet network is any network that transports data with packets. This network includes, for example, a FastPacket™ network from Cisco Technology Inc. A packet network may also be a WAN, Local Area Network (LAN) or regional network such as those associated with local exchange carriers. A packet network also may include two or more FastPacket™ networks bridged by an IP, Frame Relay, or ATM network. The bridging network (e.g., IP, Frame Relay, or ATM networks) couples the FastPacket™ networks.

Telephony control signals are distinguishable from telephony data signals. In a sense, telephony control signals are procedural whereas telephony data signals are substantive. Telephony control signals help setup and maintain the connection between telephony equipment (such as PBXs, telephones, modems and FAX machines) while telephony data signals are the substantive traffic (e.g., a telephone conversation between users) carried over the connection. This distinction between substantive and procedure is maintained with reference to packet technology discussed below.

For packet based WANs 6, the "connection" is not an actual connection since TDM technology is not employed. A protocol referred to as the Transition State Protocol (TSP) is a special form of packet based communication used to communicate telephony control signals over a FastPacket™ WAN 6.

For telephony based communications (e.g., telephone calls, FAX transmissions, etc.), control signals that indicate 1) the telephone number is dialed, 2) the telephone number is answered, 3) the receiver is off hook, and 4) the receiver is on hook are communicated over the WAN 6 by way of TSP packets and the TSP protocol. TSP packets are control packets sent over the WAN 6 to communicate these control signals between transmitting and receiving telephony equipment. A more detailed description of TSP technology for these telephony control signals is described in U.S. Pat. No. 5,115,431 entitled "Method and Apparatus For Packet Communications Signaling" issued May 19, 1992.

Referring again to FIG. 1, an originating edge node (e.g., edge node 5) needs to know if the destination edge node (e.g., edge node 7) has the ability to process, for example, a 14.4 kb/s Fax Relay signal from the WAN 6 up to a 64 kb/s traditional FAX signal for delivery to the PBX 8. If so, the originating edge node 5 can transmit the 14.4 kb/s Fax Relay signal over the WAN 6. If not, the edge node 5 may transmit a full 64 kb/s traditional signal over the WAN 6 instead since the bandwidth efficiency offered by FAX Relay is not available for this particular connection.

However, the knowledge process starts with the destination edge node 7 which results from the manner in which FAXes are transmitted. A brief discussion of FAX transmission as compared to other transmission types is helpful.

At least three types of information have traditionally been transmitted over networks: data, voice and FAXes. Voice data may be compressed since telephone users can still comprehend a conversation with less than 64 kb/s of bandwidth between them. Data information is typically transmitted via a data modem (which is distinguishable from a FAX) and may be compressed as well. Similarly, FAXed traffic may be compressed (or otherwise processed by FAX Relay) because the FAX "baseband" signal needed to reproduce the image may be transmitted with less than a 64 kb/s channel. Nevertheless, the compression or reduction methods are different between FAX Relay, data, and voice transmission. Furthermore, for edge node pairs that cannot support FAX Relay, the FAX connection is typically implemented with 32 kb/s or a full 64 kb/s effective offered load to the packet network. Thus, regardless if FAX Relay is implemented or not, a destination node needs to distinguish between a voice call, a FAX call, and a data call.

FAX and data modem connections begin with a special tone (referred to as a Called Station Identification (CED tone)) generated by the receiving device. The receiving FAX machine or data modem "answers" the call initially with a CED tone. Thus, to first order, voice calls are distinguished from FAX and data modem calls by the presence of the CED tone. FAX calls are further distinguished from data modem calls (since both are answered with the CED tone) by a v.21 preamble. Thus a destination edge node can identify a FAX call within one of its channels by first recognizing a CED tone "answered" by the FAX machine and then recognizing a v.21 preamble. FAX Relay processing may be implemented after the tone and preamble are sent. The FAX call's tone and preamble may be transmitted as a regular voice call because the voice compression algorithms do not distort the tone or preamble to the extent that it is unintelligible at the remote FAX machine.

BRIEF SUMMARY OF THE INVENTION

A method is described that involves recognizing an incoming FAX call at a destination edge node, the destination edge node supportive of at least two FAX transport manners. A first control packet is sent from the destination edge node to, an originating edge node that effectively requests transmission of the FAX call according to one of the FAX transport manners. A second control packet is sent from the originating edge node to the destination edge node that effectively confirms or refuses to confirm transmission of the FAX call according to one of the FAX transport manners.

Another method is described that involves recognizing an incoming FAX call. A first control packet is sent that effectively requests FAX Relay transmission of the FAX call. A second control packet is received that effectively confirms or refuses to confirm FAX Relay transmission of the FAX call.

An edge node is also described having a processor and a memory coupled to the processor. The memory has stored therein sequences of instructions which, when executed by the processor, cause the processor to perform the acts of recognizing an incoming FAX call. A first control packet is sent that effectively requests FAX Relay transmission of the FAX call. A second control packet is received that effectively confirms or refuses to confirm FAX Relay transmission of the FAX call.

Other features and advantages of the invention will be apparent from the accompanying drawings and from the detailed description that follows below.

BRIEF DESCRIPTION OF THE DRAWINGS

The present invention is illustrated byway of example and not limitations in the figures of the accompanying drawings in which like references indicate similar elements and in which.

DETAILED DESCRIPTION

Figure 1:
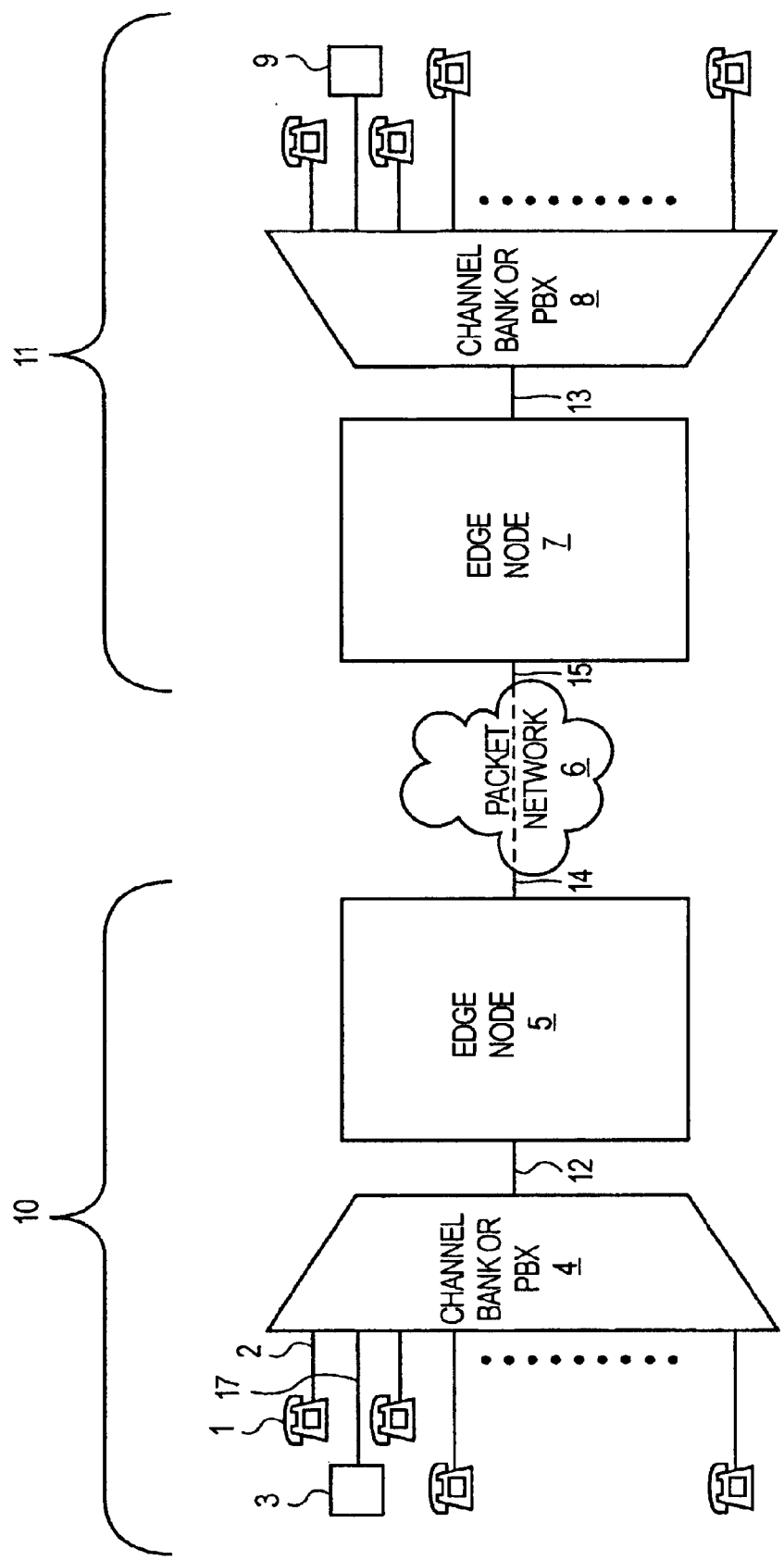
FIG. 1 shows an exemplary prior art network having a packet switched wide area network.

A method is described that involves recognizing an incoming FAX call at a destination edge node, the destination edge node supportive of at least two FAX transport manners. A first control packet is sent from the destination edge node to an originating edge node that effectively requests transmission of the FAX call according to one of the FAX transport manners. A second control packet is sent from the originating edge node to the destination edge node that effectively confirms or refuses to confirm transmission of the FAX call according to one of the FAX transport manners.

Another method is described that involves recognizing an incoming FAX call and sending a first control packet that effectively requests FAX Relay transmission of the FAX call. A second control packet is received that effectively confirms or refuses to confirm FAX Relay transmission of the FAX call.

An edge node is also described having a processor and a memory coupled to the processor. The memory has stored therein sequences of instructions which, when executed by the processor, cause the processor to perform the acts of recognizing an incoming FAX call. A first control packet is sent that effectively requests FAX Relay transmission of the FAX call. A second control packet is received that effectively confirms or refuses to confirm FAX Relay transmission of the FAX call.

A broader scope is intended for the specific edge node embodiments beyond interfacing with a channel bank or PBX located in a remote campus network. An edge node for purposes of this discussion is any device that performs translation between a packet network that carries FAX Relay traffic and another network that carries only FAX traffic other than FAX Relay traffic across its interface with the packet network. Typically, networks that do not support FAX Relay require a non-FAX Relay interface. Examples of these networks would include traditional TDM networks that carry only 64 kbps per channel (i.e., no compression or other reduction techniques apply) such as the traditional telephony equipment networks shown in FIG. 1 (i.e., PBXs 4, 8 and their associated telephones, FAX machines, modems, etc.).

Thus an edge node is any device that performs FAX Relay translation to/from a packet network that carries FAX Relay traffic. FAX Relay traffic is any networked traffic that conforms to those industry standards (or combination thereof recognized as describing compliance requirements specific to FAX Relay. For example, as discussed in the background, ITU-T standards T.4, T.6, T.30, V.17, V.21, V.27, V.29 and V.33 conform to Fax Relay related technology.

The translation method described herein involves: 1) recognizing an incoming FAX call at a destination edge node that supports FAX Relay, 2) sending a control packet from the destination edge node to the originating edge node that effectively requests FAX Relay transmission, and 3) sending a control packet from the originating edge node to the destination edge node that confirms or refuses to confirm the FAX transmission in FAX Relay format. The method can be implemented with software that runs over a processing core.

Although this method (and the associated hardware) may be extended to different forms of packet networks that support FAX Relay, for purposes of simplicity and merely as an example the following discussion is mostly in the context of a translation method for FastPacket™ based packet networks. Furthermore, although the method may be implemented in non-WAN environments, the following discussion is in the context of FastPacket™ WAN network. Thus, in further discussions (except where noted) the WAN 6 of FIG. 1 is a FastPacket™ network.

Furthermore, although the specific embodiments are discussed in connection with FAX Relay applications, the scope is intended to apply beyond the FAX Relay environment. FAX Relay may be viewed as one type of FAX transport manner. Other FAX transport manners exist, such as more traditional modes that effectively clear 32 kbps or 64 kbps of bandwidth in the WAN to send a particular FAX. Thus, generally, a FAX transport manner is any method used to send a FAX across a network.

A control packet for purposes of this discussion is any packet that travels within the packet network and contains procedural information such as (but not limited to) requests, acknowledgements, maintenance, setup, negotiation, capability exchange, or control for a connection implemented by the packet network. An example of a control packet is the aforementioned TSP packet that contains the telephony control signals. The following discussion concerns an extension of the utility of TSP packet technology to communicate FAX Relay capability between sending and receiving edge nodes for FAX transmissions.

Another TSP control packet, referred to as a FAX Relay TSP packet (or FAX Relay TSP) is disclosed. A FAX Relay TSP is a TSP packet that carries control information relevant to a FAX Relay transmission. A FAX Relay TSP is a general TSP type that encompasses a plurality of different FAX Relay related TSP control packets such as the FAX Request TSP, the ACK TSP, the NAK TSP, and the Functional TSP. Thus, each of these TSPs may also be referred to, generally, as a FAX Relay TSP. Each of these FAX Relay TSPs are discussed in more detail below.

FAX Relay TSPs are used as vehicles for communicating FAX Relay related control information in regards to the aforementioned translation method. Because the specific embodiment discussed herein involves extending TSP technology within a FastPacket™ network for FAX Relay, the FAX Relay translation method performed by the FastPacket™ edge nodes involves 1) recognizing an incoming FAX call at a destination edge node that supports FAX Relay, 2) sending a FAX Relay TSP from the destination edge node to the originating edge node requesting FAX Relay transmission, and 3) sending a FAX Relay TSP from the originating edge node to the destination edge node that confirms or refuses to confirm the FAX transmission in FAX Relay format.

Because at least three types of information are transmitted over a network (data, voice, and FAX), an edge node typically comprises at least three modes—namely, a data mode, a voice mode, and a FAX mode. Typically, the default mode of an edge node is voice mode. The edge node is usually in a state prepared for transfer of voice traffic. If a FAX arrives in a particular channel, the edge node switches from voice mode to FAX mode for that channel. If a data modem call arrives in a particular channel, the edge node switches from voice mode to "data" mode. The following discussion concerns the switchover from voice mode to FAX mode.

Once the tone and preamble are recognized, therefore, the destination edge node should "switchover" from a voice mode to a FAX mode. Recognizing the FAX call simply means it is known by the destination node that a FAX call exists on the channel. Voice mode means the edge node is supporting voice traffic for the particular channel. FAX mode means the edge node is supporting FAX traffic for the particular channel. Before substantive FAX data is sent, the destination edge node should be ready to process either FAX Relay processed data or (for example) an effective 32 kb/s or 64 kb/s stream for the particular channel. Otherwise, if no switchover from voice mode occurs and substantive FAX data is sent as a compressed voice signal (i.e., the FAX's image data is compressed by a voice compression algorithm) the quality of the FAX signal at the receiving end is unacceptable.

Figure 2:
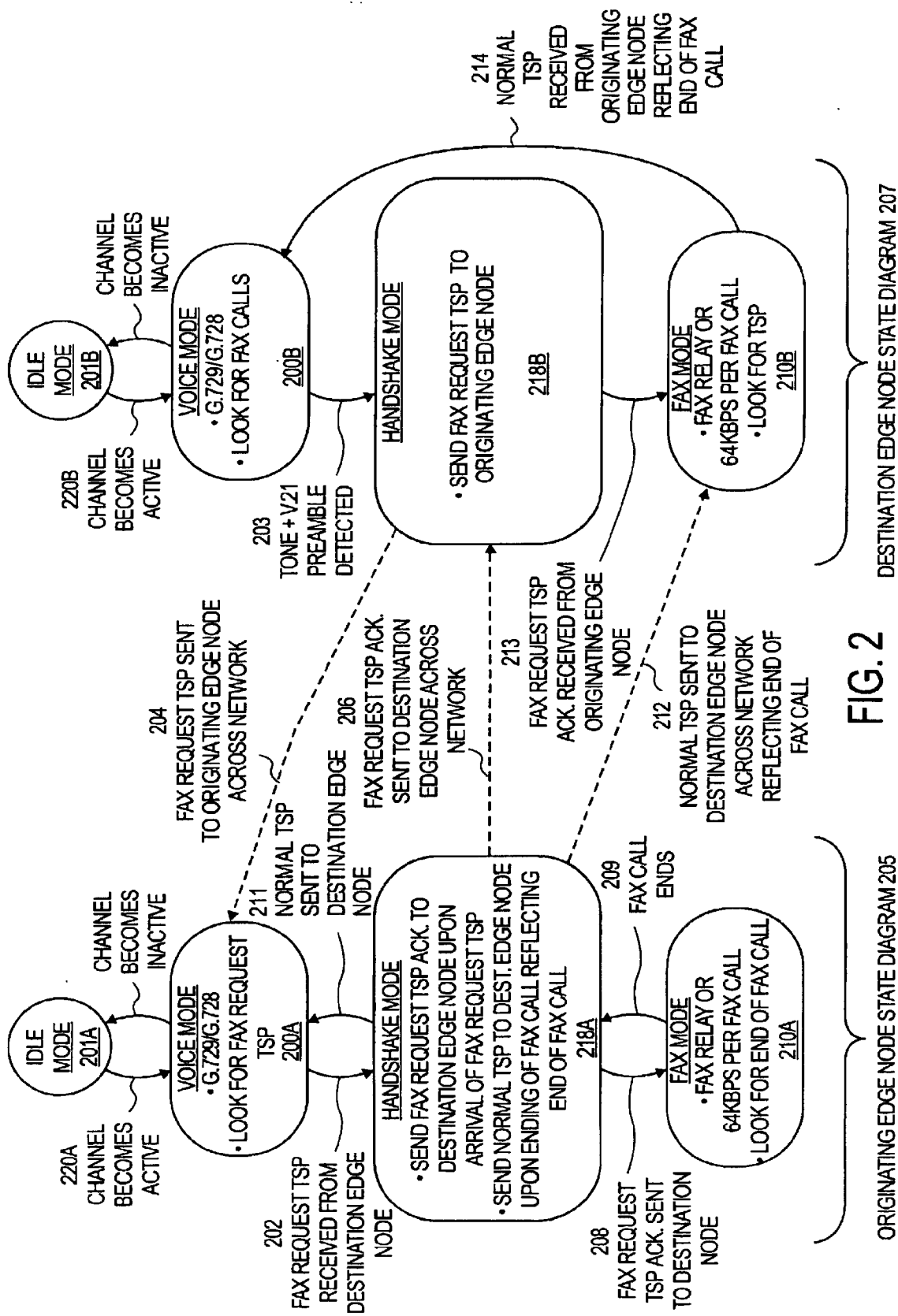
FIG. 2 shows an embodiment of a state diagram capable of voice-FAX mode switchover.

FIG. 2 is an embodiment of a state diagram 205, 207 capable of voice-FAX mode switchover for a channel between an originating edge node and a destination edge node. For one embodiment, each channel (e.g., one of 24 slots in a T1 frame or one of 32 slots in an E1 frame) is managed individually by both the origination and destination edge nodes. Furthermore, each edge node manages the same channel individually, meaning that each edge node manages the same channel according to its own state diagram intelligence. Thus FIG. 2 shows two state diagrams 205, 207 for the same channel—one diagram 205 associated with the channel management by the originating edge node and another diagram 207 associated with the channel management by the destination edge node.

The initial state for a channel is "idle" mode 201a,b. In idle mode 201a,b, the channel is not recognized as "live" and is not able to transport traffic. Idle mode 201a,b is typically used during the transient bring-up time for an adapter card, system diagnostics, and or clock synchronization with the particular equipment transporting the channel. Once clock synchronization and other contingencies are met, the channel may be actually used in a network. At this point, the voice mode state 200a,b is entered. In voice mode 200a,b the channel may be used for voice traffic applications. For this embodiment, voice channels compliant with ITU-T standards G.729 or G728 are implemented. Other embodiments, however, may use G.711, G.726, G.727 and G.723.1.

Once the channel state is in voice mode 200a,b, the destination edge node is responsible for detecting FAX calls as well as managing voice calls within the channel. Thus, voice mode 200b is responsible not only for managing voice calls but also detecting FAX calls. Incoming FAX calls are identified by detecting a special tone (e.g., a CED tone) which flags a FAX or data modem call and then further detecting a V.21 preamble. State transition 203 to handshake mode state 218b refers to an instance where the tone and preamble have been identified on the channel. Thus state transition 203 occurs when the tone and preamble are sent by the destination telephony equipment.

Handshake mode state 218b within the edge node is responsible for determining the FAX Relay capabilities of the originating edge node and then transitioning the destination edge node to the particular FAX mode supported by the originating edge node. For example, as discussed, a problem with implementing FAX Relay is the presence of equipment that does not support FAX Relay. The following four combinations are possible: 1) both the originating edge node and the destination edge support FAX Relay, 2) the originating edge node supports FAX Relay while the destination edge node does not, 3) the destination edge node supports FAX Relay while the originating edge node does not, and 4) neither the originating or destination edge nodes support FAX Relay.

Only in the first instance is FAX Relay processing used. In the remaining three combinations, a traditional approach (such as effectively clearing 32 kb/s or 64 kb/s through the packet network for a single FAX call) must be used. The purpose of determining (by the destination node) the FAX Relay capabilities of the originating edge node is to ultimately place both nodes in the proper FAX transport mode—i.e., either FAX Relay or another more traditional mode (e.g., 32 kb/s or a full 64 kbps per FAX call).

While in a traditional FAX mode (e.g., 32 kb/s or full 64 Kbps per FAX call), software used to support voice mode 200a,b may be used. For example, software that enables G.729/G.728 related transport may be used to set up a 64 Kbps FAX channel as well as a voice call. FIG. 2 represents a true state diagram. When the channel is in FAX mode 210a,b, the channel supports FAX traffic. When the channel is in voice mode 200a,b, the channel supports voice traffic. Nevertheless, there may be some overlap in terms of the organization of the software. In some cases, for example, a block of software may be used to support both G.729 or G.728 voice mode 200a,b and FAX mode 210a,b.

For destination edge nodes that support FAX Relay, communicating and understanding the FAX Relay capabilities of the originating edge node is accomplished by first sending a FAX Request TSP control packet to the originating edge node (from the destination edge node) that effectively requests FAX Relay Service. This may be accomplished, for example, by (1) specifically requesting FAX Relay transport, or (2) indicating FAX Relay capability exists at the destination edge node, or (3) inquiring into the FAX Relay capability of the originating edge node.

The destination edge node then waits for an acknowledgement from the originating edge node that, after receipt of the acknowledgement and subsequent processing by the destination edge node, effectively confirms or denies FAX Relay transmission of the FAX. The destination edge node, by receiving and processing the acknowledgement, comprehends the acknowledgement. If the originating edge node supports FAX Relay, the acknowledgement indicates as much and the FAX is transported using FAX Relay processing. If the originating edge node does not support FAX Relay, the acknowledgement again indicates as much and the FAX is transported by other more traditional means.

For destination edge nodes that do not support FAX Relay, a traditional approach for sending FAXes across the packet network must be used. One traditional approach, as discussed, is to send the FAX with effectively 32 kbps or 64 kbps of bandwidth consumption within the packet network. Destination nodes that do not support FAX Relay may therefore send another FAX Request TSP control packet that requests non-FAX Relay service or otherwise indicates a FAX transport mode other than FAX Relay should be used.

Assuming the destination edge node supports FAX Relay, upon entry to the handshake mode state 218b of FIG. 2, the destination edge node sends 204 a FAX Request TSP to the originating edge node across the network requesting FAX Relay service (or e.g., inquiring into the FAX Relay capability of the originating node). The destination node handshake mode 218b then waits for the acknowledgment from the originating edge node.

Referring to the originating edge node state diagram 205, the voice mode state 200a is used to manage voice connections and detect TSPs, directed to the corresponding channel. When the FAX Request TSP sent 204 across the network is detected by the originating edge node's voice mode state 200a, a transition 202 occurs from the voice mode state 200a to the handshake mode state 218a. Thus, the originating edge node's voice mode state 200a is responsible for detecting incoming FAX Request TSPs as well as managing voice calls.

The handshake mode 218a associated with the originating station then sends 206 an acknowledgement to the destination edge node. This acknowledgement may also be referred to as a FAX Request TSP acknowledgement because it contains information the destination edge node uses to determine whether the originating edge node has FAX Relay capability. For this embodiment, the FAX Request TSP acknowledgement (like the FAX Request TSP) is a special form of TSP packet. There may be two FAX Request TSP acknowledgement types. One type, referred to as an ACK TSP, responds positively to a FAX Relay Request. Another type, referred to as an NAK TSP, responds negatively to a FAX Relay Request.

While the originating edge node processes the FAX Request TSP from the destination edge node and responds with the FAX Request TSP acknowledgement, the originating edge node also recognizes it is sending a FAX over the corresponding channel. Thus, reception 204 of the FAX Request TSP triggers awareness at the originating edge node that a FAX will be carried across the corresponding channel. As such, the originating edge node is not necessarily aware it is sending a FAX until it receives the FAX Request TSP from the destination edge node. Thus the transition 208 from the handshake mode state 218a to the FAX mode state 210a at the origination edge node typically occurs after the origination edge node receives the FAX Request TSP and sends the appropriate acknowledgement to the destination edge node.

The FAX mode state 210a associated with the originating edge node is responsible for managing the transmission of the FAX across the packet network. For the embodiment discussed in reference to FIG. 2, the destination edge node supports FAX Relay. Thus, in this example, whether or not FAX Relay transport is implemented depends upon the capabilities of the origination node. FIG. 2 leaves this question open. The origination state diagram 205 may be executed on hardware that supports or does not support FAX Relay. Thus the FAX mode state 210a is responsible for rendering the FAX information into FAX Relay mode if the origination edge node supports FAX Relay. The FAX Relay mode state 210a is also responsible for sending the FAX in a traditional format (such as those already described) if the origination edge node does not support FAX Relay. Code used to support voice mode transmissions may be used in some instances to transport such traditional FAX formats.

Transferring 208,213 to FAX mode 210a,b (as well as transferring to Voice mode 200a,b) may involve loading software into memory associated with a processing core responsible for handling the transportation across the channel. Alternatively, the jump to FAX mode 210a,b (as well as Voice mode 200a,b) may be a jump in a software state where all appropriate software is kept in an active memory simultaneously. The memory is typically associated with a microprocessor (such as a ROM, SRAM or DRAM memory chip) or a DSP.

The originating edge node recognizes the end of the FAX call 209 (which terminates the FAX mode state 210a) and sends at step 212 another TSP to the destination edge node (which indicates the FAX call is over). FAX calls end when the originating edge node detects a disconnect signal (DSN) 209. When this occurs, the originating edge node sends a TSP at step 212 as described in U.S. Pat. No. 5,115,431. A non-FAX Relay TSP is sent at step 212. Thus existing TSP technology may be used to indicate the FAX call has ended. As such FIG. 2 labels this packet as "Normal TSP" sent at step 212 to the destination edge node. Thus the FAX mode state 210a transitions at step 209 to the handshake mode 218a in order to send this Normal TSP. After the Normal TSP is sent the originating node transitions 211 to the voice mode 200a state. Similarly, when the Normal TSP is received, the destination edge node transitions at step 214 from FAX mode 210b to voice mode 200b.

State diagram concepts should be distinguished from hardware implementation. The hardware implementation of the aforementioned process may employ a "handshake unit" responsible for encapsulating transmitted TSPs and decapsulating received TSPs. Such a unit is therefore always involved when TSPs are exchanged between edge nodes. Note that FIG. 2 shows the handshake mode 218a sending a TSP to the destination FAX mode 210b. The fact that the TSP is decapsulated at the destination node by the handshake unit is not shown in FIG. 2 because the destination node is formally in the FAX mode state 210b. Thus FIG. 2 intends to convey the concept that the TSPs may be received and processed by certain hardware units before the relevant information within these TSPs (such as "the FAX call has ended") are ultimately comprehended and directed to the current state controlling the operation of the channel.

The state diagram embodiments 205, 207 of FIG. 2 indicate the handshake mode units 218a,b are only entered to send a TSP across the network. Other state diagram embodiments may absorb this function into the appropriate voice 200a,b or FAX 210a,b states. That is, other state diagram embodiments may define the voice mode state 200a as responsible for not only detecting FAX Request TSPs but also sending the FAX Request TSP acknowledgement itself. The destination voice mode 200b and the FAX mode states 210a,b may be similarly tailored to absorb handshake mode functionality. The depiction shown in FIG. 2 was chosen for demonstrative simplicity and should not be used to limit the invention to the specific embodiment shown. FIGS. 4–8, discussed ahead, relate to an example where handshake mode 218a,b is absorbed into the functionality of voice states 200a,b.

Furthermore, the state diagrams of FIG. 2 may be employed by edge nodes separated by networks other than a FastPacket™ network. The state diagram of FIG. 2 (and other embodiments of it) may be utilized by ATM edge nodes, Frame Relay edge nodes, or IP based edge nodes. Because TSP packets are typically used only for FastPacket™ networks, other control packet forms that correspond to other packet networks may be used.

The FAX Request TSP discussed above is just one embodiment of a FAX Request control packet. FAX Request control packets are control packets that effectively request FAX Relay transmission of a FAX. FAX Request control packets may be utilized in other networking environments besides FastPacket™ networks. Similarly, ACK and NAK TSPs are just one embodiment each of ACK and NAK control packets, generally. ACK control packets are control packets that effectively acknowledge the FAX will be transmitted according to a FAX Relay format. NAK control packets are control packets that effectively acknowledge the FAX will not be transmitted according to a FAX Relay format. Furthermore, the ACK and NAK TSPs are both different embodiments of acknowledgement control packets. Acknowledgement control packets effectively communicate whether or not the FAX will be transmitted according to a FAX Relay format.

Figure 3:
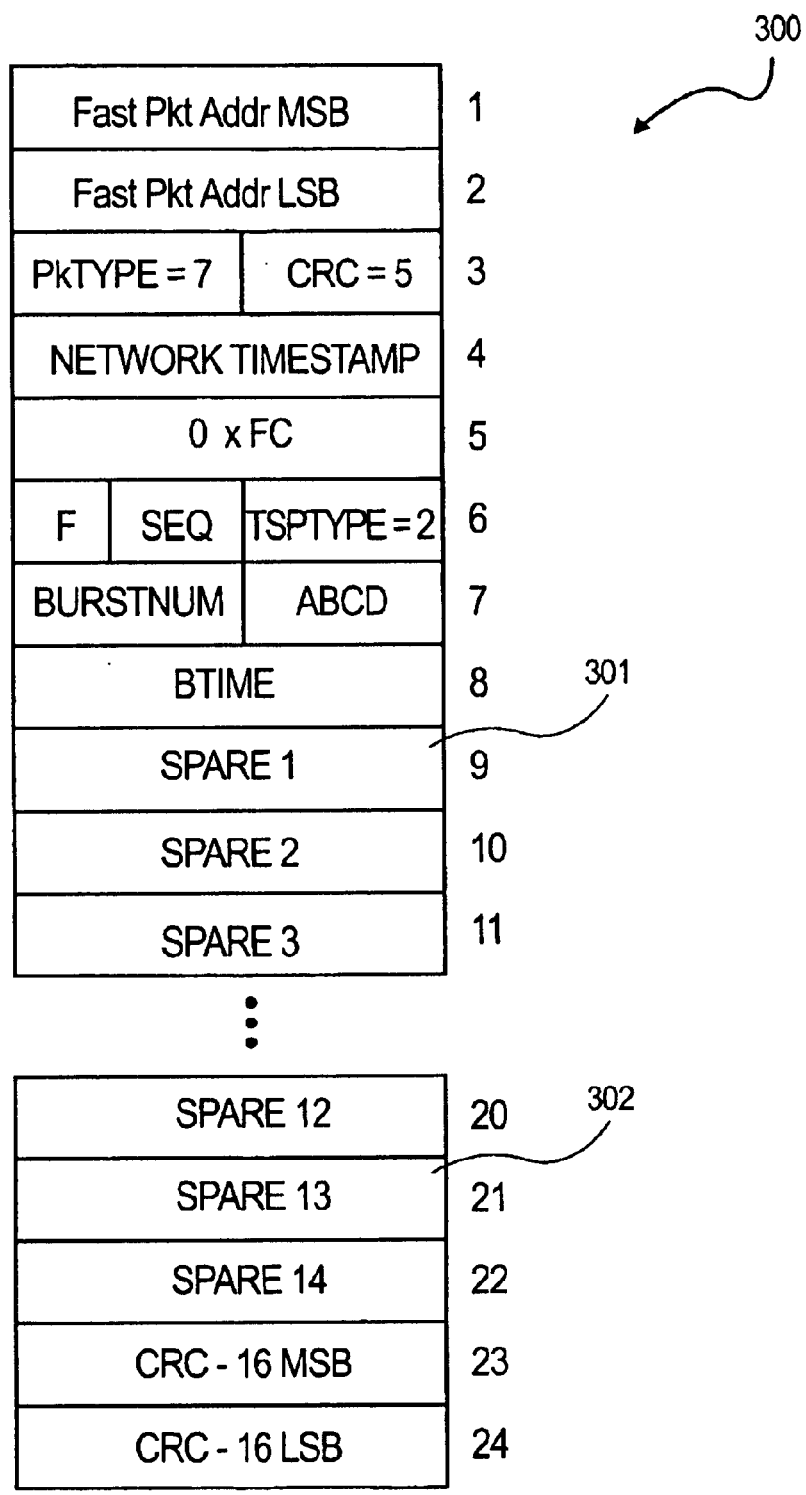
FIG. 3 shows an example of a TSP packet format.

FIG. 3 illustrates an example of the TSP packet format 300 that is one byte wide (horizontal) and 24 bytes deep (vertical). This packet format corresponds to the general format shown in FIG. 9 of U.S. Pat. No. 5,115,431. Because the FAX Relay related communication between edge nodes is an extension of the TSP technology discussed in U.S. Pat. No. 5,115,431, the TSP packet 300 of FIG. 3 has unique content as compared to earlier TSP packets.

For one embodiment, spare byte 301 of the TSP packet 300 is specially manipulated to communicate FAX Relay related information between edge nodes. For this embodiment, spare byte 301 specifies whether the TSP packet 300 corresponds to 1) a traditional TSP, 2) a FAX Request TSP (such as the FAX Request TSP sent 204 in FIG. 2), 3) a Functional TSP (described ahead), 4) an ACK TSP (which is a type of acknowledgement that may be sent 206 as shown in FIG. 2), or 5) a NAK TSP (which is, again, a type of acknowledgement that may be sent 206 as shown in FIG. 2). For a specific embodiment, the traditional TSP, FAX Request TSP, FAX Relay TSP, ACK TSP and NAK TSP are given values of 0x77, 0x01, 0x02, 0x11, and 0x12, respectively. Thus, if an originating edge node receives a TSP having a value of 0x01 in spare byte position 301, the originating edge node understands FAX Relay transmission is requested on the corresponding channel.

For the same embodiment, spare byte 302 is used to communicate the specific FAX Relay formats (e.g., 9.6 kbps FAX Relay) supported on the corresponding edge node. If an originating edge node receives a FAX Request TSP for a FAX Relay format the originating node cannot support, it simply refuses to respond with an ACK TSP. Other FastPacket™ embodiments may use different values and/or different spare byte positions. Furthermore, as discussed, other non-FastPacket™ embodiments may use control packet formats that differ from the TSP format shown in FIG. 3 and/or correspond to their respective network (e.g., an OAM cell for an ATM network).

FIGS. 4 through 8 relate to further extensions of the basic state diagrams 205, 207 described with reference to FIG. 2, with the exception that the functionality of the handshake mode units 218a,b are absorbed into the functionality of the voice states 200a,b. A voice state may also be referred to as a voice mode. The communication between the edge nodes should be robust enough to handle FAX calls reliably even if FAX Request control packets or acknowledgement control packets are dropped in transit across the packet network. For simplicity, embodiments specific to FastPacket™ technology are mostly described.

Figure 4:
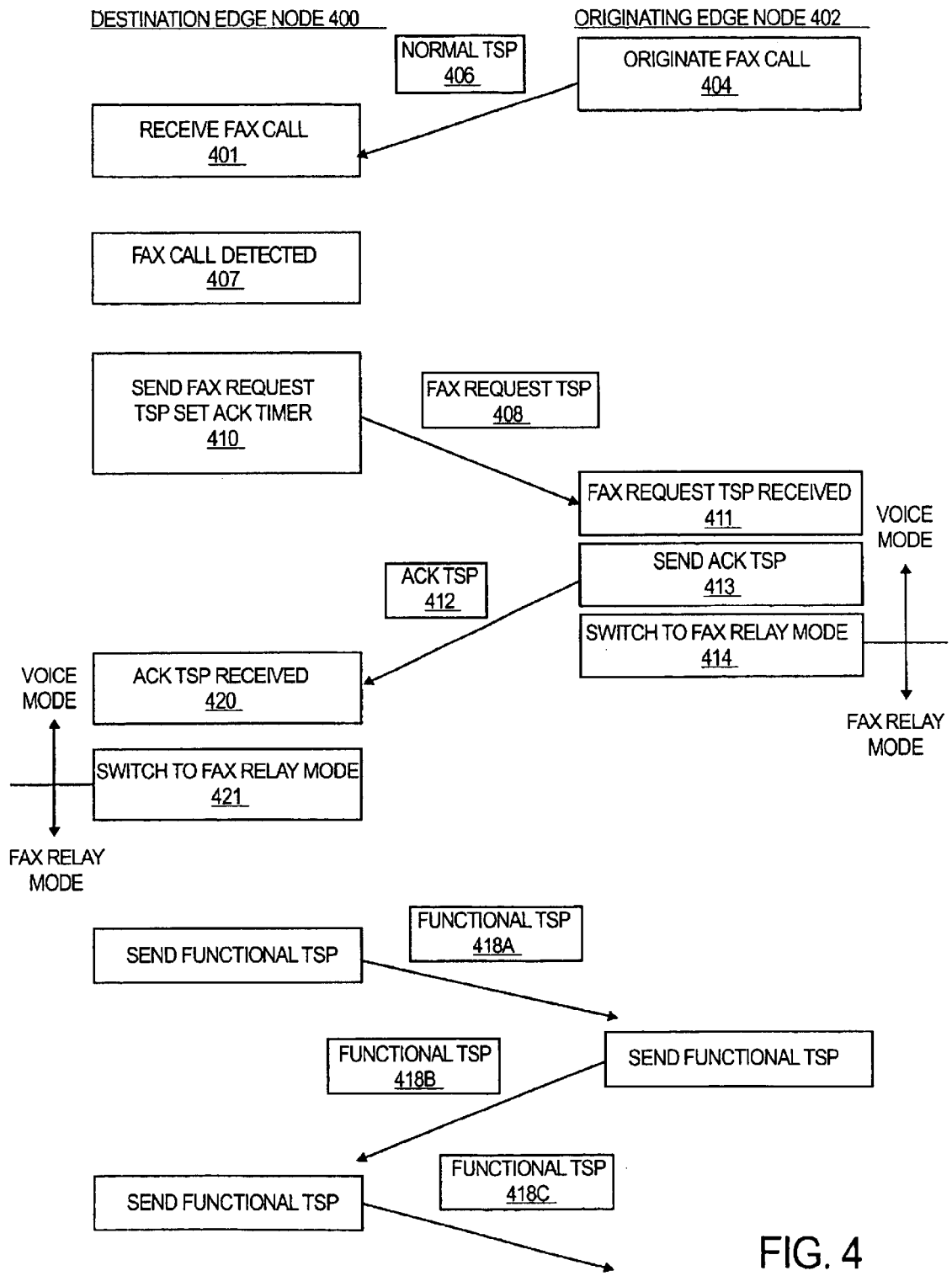
FIG. 4 shows an example of an acknowledgement timeout.

Referring to FIG. 4, once the FAX Relay supportive destination edge node 400 identifies 407 the fax tone and preamble (in response to a call 404 from an originating edge node 402), the node 400 transmits at step 410 a FAX Request TSP 408 to the originating edge node 402 and begins a timer 410, referred to as the "ACK timer" for response from the originating station 402. The timeout is typically estimated to be the maximum duration required (e.g., for calls routed over satellite links) to send a FAX Request TSP 408 and receive an acknowledgement TSP (e.g., ACK TSP 412) from the opposite end. For one embodiment the timer value is one second, but other embodiments may have different values depending on the worst case conditions one designs for. The destination edge node 400 should also suspend transmissions in this channel until the ACK TSP 412 is received. At that point, the destination edge node 400 will know both nodes 400,402 are "in sync" (i.e., both are in the same mode).

If the originating edge node 402 receives 411 the FAX Request TSP 408 and determines that the upgrade request can be fulfilled, the originating station 402 sends 413 an ACK TSP 412 to the destination edge node 400 and then converts to Fax Relay mode 414. FAX Relay mode is the FAX mode or state corresponding to FAX Relay operation. If the destination edge node 400 receives 420 the ACK TSP 412 before the timeout expires, the destination edge node 400 switches 421 to FAX Relay mode of operation.

Functional TSPs 418a,b,c are used as "heartbeat" signals that allow the edge nodes 400, 402 to confirm with each other that they are still in FAX Relay mode. Similarly, when the edge nodes are not in FAX Relay mode (such as voice mode or a FAX mode in which traditional transport methods are used), the edge nodes trade Normal TSPs with each other to confirm they are still are still in the same non FAX Relay mode. This is consistent with the idea that Normal TSPs may be used with traditional voice and FAX methods. Normal TSPs operate as described in the U.S. Pat. No. 5,115,431.

Figure 5:
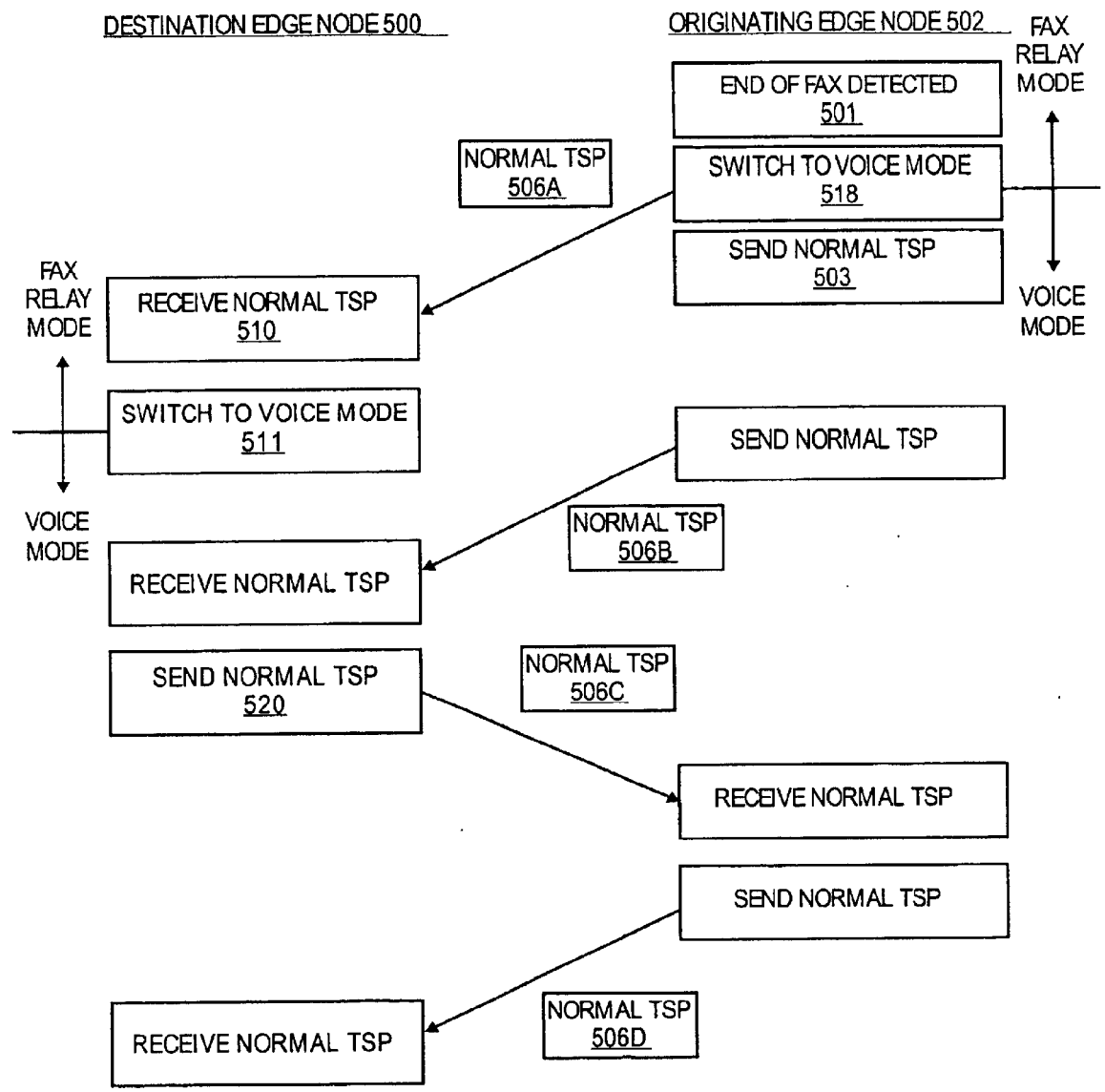
FIG. 5 shows an example of FAX Relay mode termination.

FIG. 5 illustrates an example of FAX Relay mode termination. For the example of FIG. 5, the originating station 502, upon detecting 501 an end of FAX condition, sends 503 a Normal TSP 506a to the destination edge node 500 and switches over to voice mode 518. Again, Normal TSPs operate as described in the U.S. Pat. No. 5,115,431.

When the destination edge node 500 receives 510 the Normal TSP 506a, destination edge node 500 understands that the FAX call is over and switches back to voice mode 511. At this point, both edge nodes are in voice mode and the channel is operating as a voice channel rather than a FAX channel. End of FAX conditions may also be detected at the destination edge node 500 (e.g., the receiving FAX machine disconnects from the channel). In such cases a mirror process of FIG. 5 occurs. That is, the destination edge node transmits the initial Normal TSP. In this example, Normal TSPs 506a,b,c,d are used as heartbeat signals between nodes that are not in FAX Relay mode. Normal TSPs are traded between non FAX Relay nodes so that each understands the state of the other.

Figure 6:
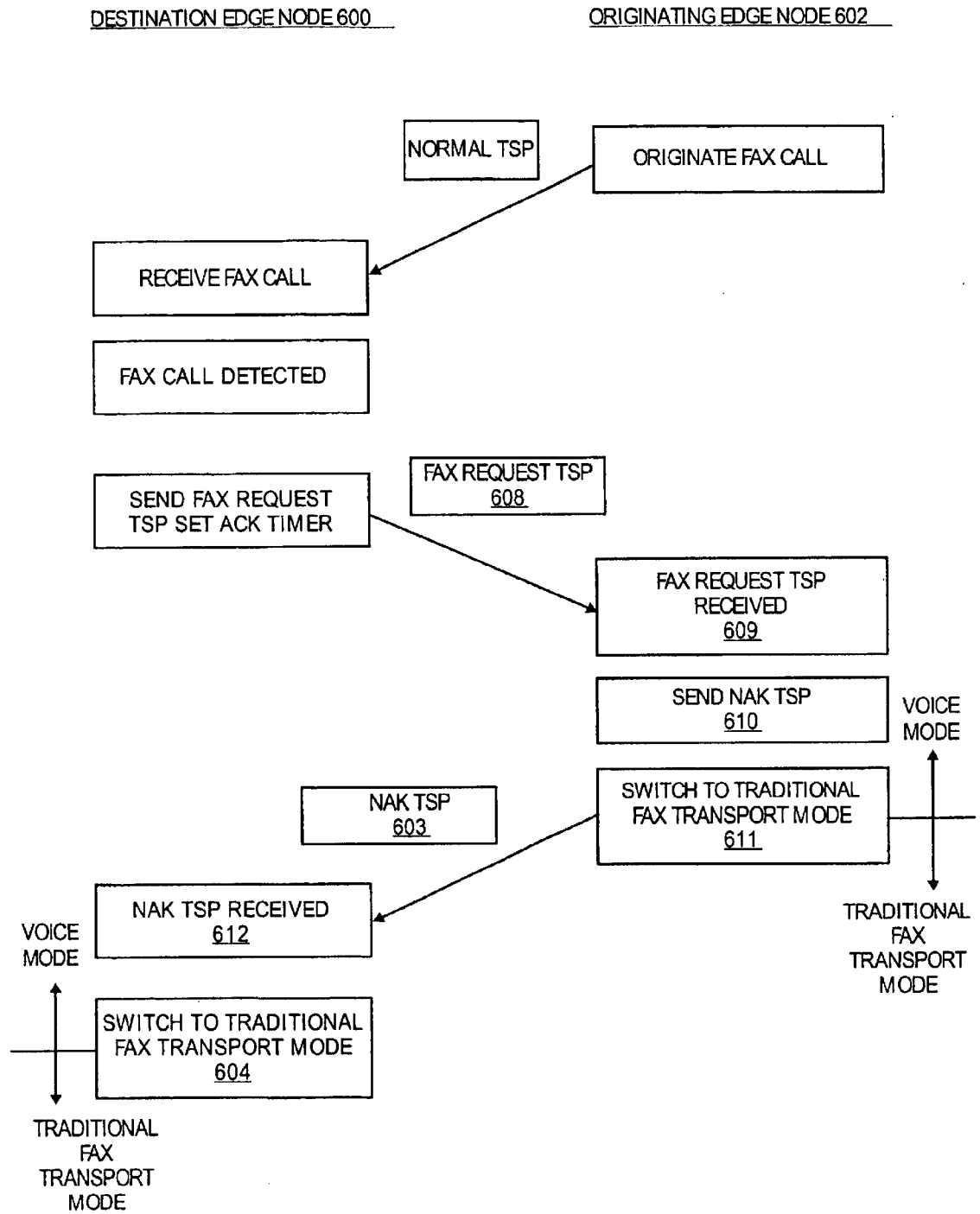
FIG. 6 shows an example where FAX Relay mode is refused upon receipt of a FAX Request TSP.

FIG. 6 illustrates a scenario where FAX Relay mode is refused upon receipt 609 of a FAX Request TSP 608 by the originating edge node 602. If the originating edge node 602 receives at step 609 the FAX Request TSP 608 and is unable to fulfill the request to operate in FAX Relay mode, the originating edge node 602 transmits at step 610 a NAK TSP 603 and transitions at step 611 to a fax mode that transports FAXes according to a traditional scheme. The destination edge node 600 aborts any FAX Relay upgrade attempt when it receives at step 612 the NAK TSP and transitions at step 604 to a traditional FAX transport mode.

Figure 7:
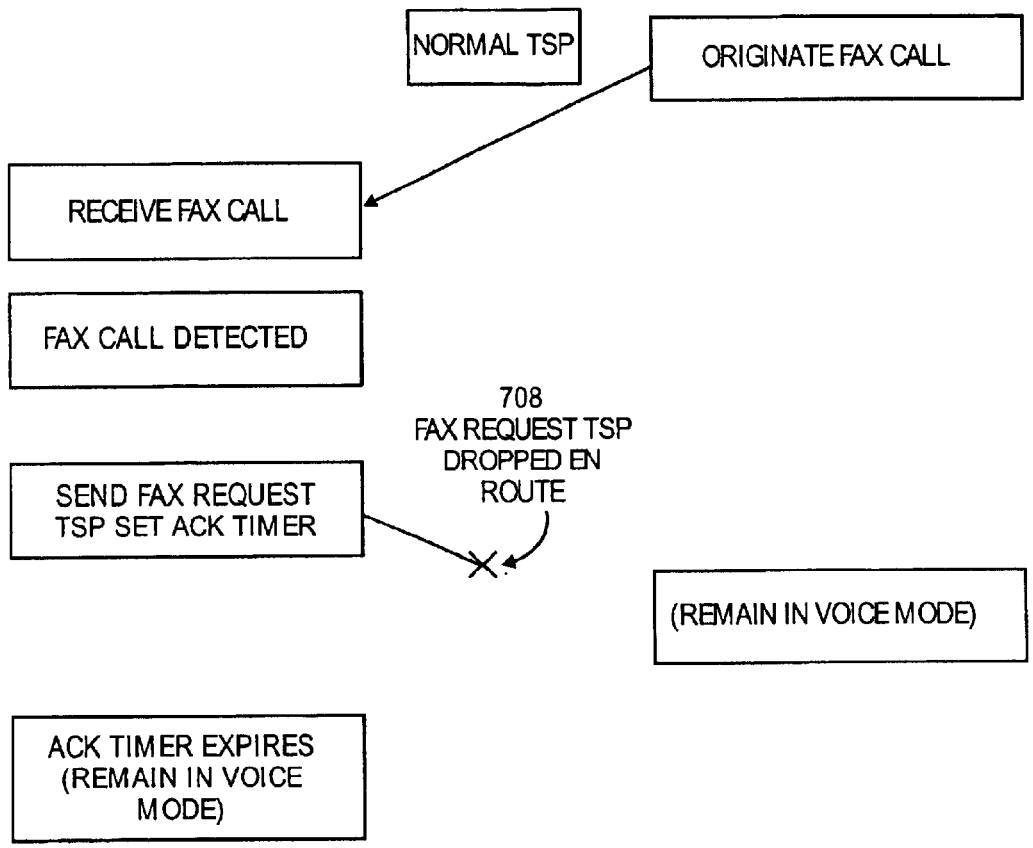
FIG. 7 shows an example where a FAX Request TSP is dropped.

FIG. 7 illustrates a scenario where the FAX Request TSP is dropped at step 708. If the Fax Request TSP sent to the originating edge node 702 by the destination edge node 700 is dropped at step 708, the originating edge node 702 will not respond with an ACK TSP. In such a case the FAX call fails during setup and the two telephony equipment terminals (e.g., the sending and receiving FAX machines) disconnect. Thus, at the destination edge node 700, the ACK timeout expires at step 703 and the channel does not enter a FAX mode state. Similarly, because the originating edge node does not receive a FAX Request TSP, the originating edge node does not enter a FAX mode state. Thus both nodes 700, 702 remain in voice mode.

Figure 8:
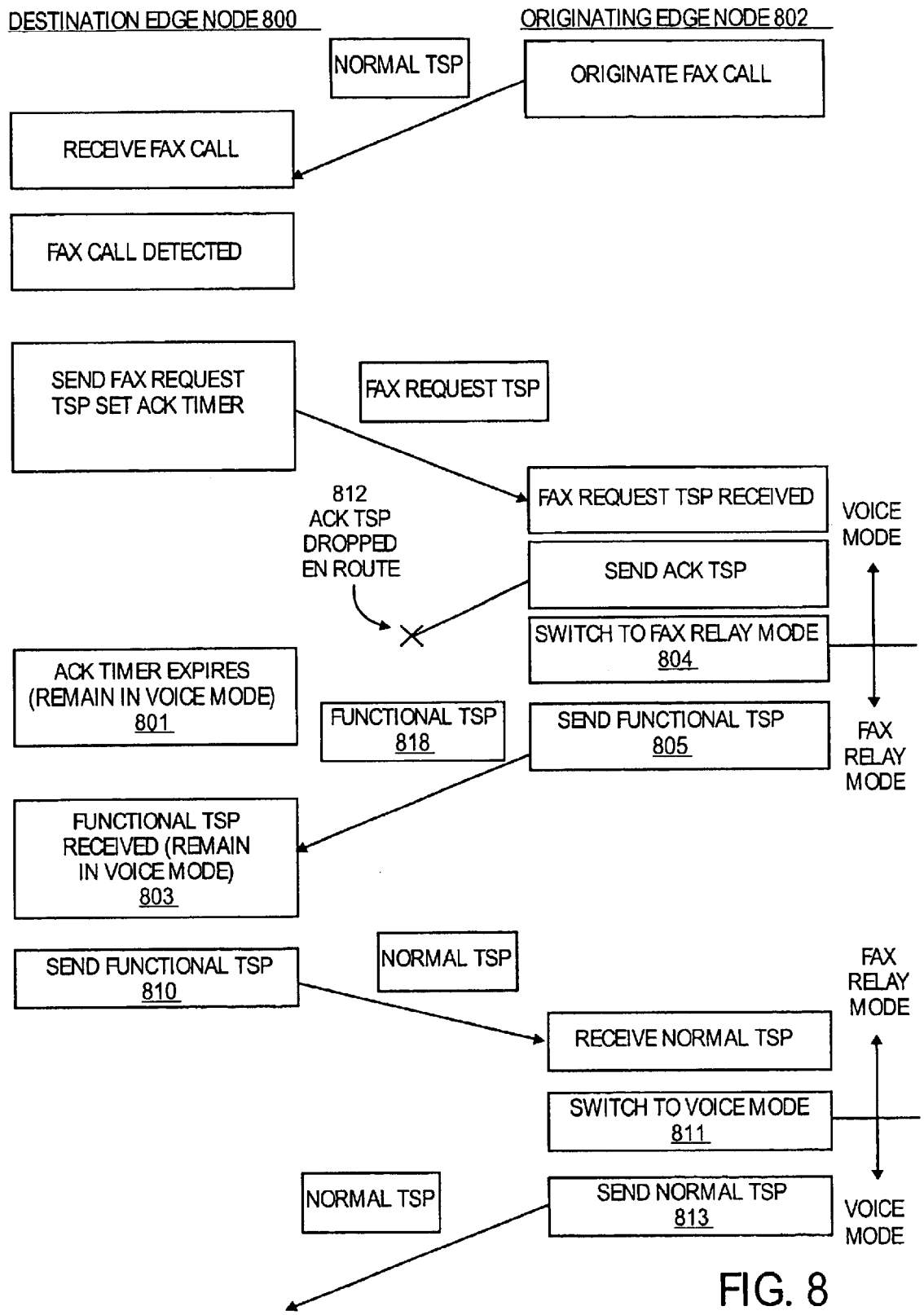
FIG. 8 shows an example where an ACK TSP is dropped.

FIG. 8 illustrates a scenario where an ACK TSP 812 is dropped. If the ACK TSP is dropped 812 en route from the originating edge node 802 to the destination edge node 800, then the ACK timeout expires 801. As a result, the destination edge node 800 does not enter FAX mode and remains in voice mode. The originating edge node 802 meanwhile switches at step 804 to FAX Relay mode and sends at step 805 a Functional TSP 818. The Functional TSP 818 when received at step 803 at the destination edge node 800 is effectively ignored since the edge node 800 is not in FAX Relay mode. FAX Relay TSPs (having FAX Relay identifiers such as those within spare byte 301 of FIG. 3) are ignored if the edge node that receives a FAX Relay TSP is not in FAX Relay mode.

Because the destination edge node 800 is in voice mode, the destination edge node 800 eventually sends at step 810 a Normal TSP "heartbeat" 809 back to the originating edge node 802. This triggers a state transition 811 from FAX Relay mode to voice mode at the originating edge node 802. Thus, receipt of a non FAX Relay TSP by an originating edge node in FAX Relay mode triggers a transition from FAX Relay mode to voice mode. The originating edge node 602 eventually sends 813 back a Normal TSP 810. At this point, both nodes 800, 802 are in voice mode and the FAX call is effectively dropped.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A method, comprising:
    a) recognizing an incoming facsimile (FAX) call at a destination edge node, said destination edge node supportive of at least two facsimile transport manners;
    b) sending a first control packet from said destination edge node to an originating edge node that effectively requests transmission of said facsimile call according to one of said facsimile transport manners; and
    c) receiving a second control packet from said originating edge node to said destination edge node that effectively confirms or refuses to confirm facsimile transmission of said facsimile call according to one of said facsimile transport manners.

2. The method of claim 1 wherein one of said facsimile transport manners is FAX Relay.

3. The method of claim 1 wherein said control packets traverse an Asynchronous Transfer Mode network.

4. The method of claim 1 wherein said control packets traverse a Frame Relay network.

5. The method of claim 1 wherein said control packets traverse an IP based network.

6. The method of claim 1 wherein said control packets traverse a FastPacket network.

7. The method of claim 2 wherein said control packets are FAX Relay TSP control packets.

8. The method of claim 7 wherein said first control packet is a FAX Request TSP.

9. The method of claim 7 wherein said second control packet is a FAX Request TSP acknowledgement.

10. The method of claim 9 wherein said second control packet is an ACK TSP.

11. The method of claim 9 wherein said second control packet is a NAK TSP.

12. The method of claim 2 further comprising switching said destination node to a FAX mode supportive of FAX Relay transmission if said second control packet effectively confirms FAX Relay transmission.

13. The method of claim 2 further comprising switching said destination node to a FAX mode supportive of 64 kbps per channel if said second control packet refuses to effectively confirm FAX Relay transmission.

14. A method, comprising:
   a) recognizing an incoming facsimile (FAX) call;
   b) sending a first control packet that effectively requests facsimile Relay transmission of said facsimile call; and
   c) receiving a second control packet that effectively confirms or refuses to confirm facsimile Relay transmission of said facsimile call.

15. The method of claim 14 further comprising switching to a FAX mode supportive of FAX Relay transmission if said second control packet effectively confirms FAX Relay transmission.

16. The method of claim 14 further comprising switching to a FAX mode supportive of 64 kbps per channel if said second control packet refuses to effectively confirm FAX Relay transmission.

17. The method of claim 14 wherein said control packets are FAX Relay TSP control packets.

18. The method of claim 17 wherein said first control packet is a FAX Request TSP.

19. The method of claim 17 wherein said second control packet is a FAX Request TSP acknowledgement.

20. The method of claim 14 wherein said recognizing an incoming FAX call is performed in a voice mode.

21. The method of claim 20 wherein said recognizing an incoming FAX call causes a transition to a handshake mode.

22. The method of claim 21 wherein said sending a first control packet and said sending a second control packet are performed in said handshake mode.

23. The method of claim 22 wherein said confirmation or said refusal to confirm FAX Relay transmission causes a transition to a FAX mode.

24. The method of claim 23 further comprising the sending of Functional TSPs between said destination and said edge nodes if said FAX mode is in FAX Relay mode.

25. The method of claim 24 further comprising the sending of a Normal TSP from said originating node to said destination node to terminate said FAX call.

26. The method of claim 14 further comprising the initiation of a timer when said first control packet is sent.

27. The method of claim 26 further comprising dropping said FAX call when said timer expires.

28. An edge node having a processor and a memory coupled to the processor, the memory having stored therein sequences of instructions which, when executed by the processor, cause the processor to perform the acts of:
   a) recognizing an incoming facsimile call;
   b) sending a first control packet that effectively requests facsimile Relay transmission of said facsimile call; and
   c) receiving a second control packet that effectively confirms or refuses to confirm facsimile Relay transmission of said facsimile call.

29. A machine readable medium having stored thereon sequences of instructions, which when executed by an edge node, cause the edge node to perform the acts of:
   a) recognizing an incoming facsimile call;
   b) sending a first control packet that effectively requests facsimile Relay transmission of said facsimile call; and
   c) receiving a second control packet that effectively confirms or refuses to confirm facsimile Relay transmission of said facsimile call.

30. An apparatus, comprising:
   means for recognizing an incoming facsimile (FAX) call;
   means for sending a first control packet that effectively requests facsimile Relay transmission of said facsimile call; and
   means for receiving a second control packet that effectively confirms or refuses to confirm facsimile Relay transmission of said facsimile call.

31. The apparatus of claim 30, further comprising means for switching to a FAX mode supportive of FAX Relay transmission if said second control packet effectively confirms FAX Relay transmission.

32. The apparatus of claim 30, further comprising means for dropping said FAX call.

* * * * *